United States Patent
Watanabe et al.

(10) Patent No.: US 7,530,730 B2
(45) Date of Patent: May 12, 2009

(54) HEAT EXCHANGING MECHANISM FOR A CYLINDER OF AN EXTRUDER

(75) Inventors: Hirofumi Watanabe, Hiroshima (JP); Kazuhiro Kodate, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 324 days.

(21) Appl. No.: 11/519,868

(22) Filed: Sep. 13, 2006

(65) Prior Publication Data
US 2007/0065533 A1 Mar. 22, 2007

(30) Foreign Application Priority Data
Sep. 13, 2005 (JP) ............................ P2005-265184

(51) Int. Cl.
*B29B 7/82* (2006.01)
*B29C 47/80* (2006.01)
(52) U.S. Cl. .................. 366/149; 165/74; 425/378.1
(58) Field of Classification Search .................. 366/69, 366/147, 149; 425/547, 550, 378.1; 165/73, 165/74, 109.1
See application file for complete search history.

(56) References Cited

U.S. PATENT DOCUMENTS

| | | | | |
|---|---|---|---|---|
| 3,831,665 A * | 8/1974 | Knaus | ........................... | 165/87 |
| 4,415,268 A * | 11/1983 | Brinkmann et al. | ........... | 366/85 |
| 4,643,660 A * | 2/1987 | Capelle | ...................... | 425/190 |
| 5,054,932 A * | 10/1991 | Kangas | ........................ | 366/84 |
| 5,800,055 A * | 9/1998 | Sato | ............................. | 366/75 |
| 6,382,948 B1* | 5/2002 | Takatsugi et al. | ........... | 425/143 |
| 2005/0259507 A1* | 11/2005 | Ronkin et al. | .................. | 366/69 |
| 2007/0065533 A1* | 3/2007 | Watanabe et al. | ........ | 425/378.1 |

FOREIGN PATENT DOCUMENTS

| | | | | |
|---|---|---|---|---|
| DE | 3540024 A1 * | 5/1986 | | |
| JP | 5-057768 A | 3/1993 | | |
| JP | 10119051 A * | 5/1998 | | |
| JP | 11-198215 A | 7/1999 | | |

* cited by examiner

*Primary Examiner*—Charles E Cooley
(74) *Attorney, Agent, or Firm*—Sughrue Mion, PLLC

(57) ABSTRACT

According to an embodiment of the invention, the heat exchanging mechanism includes a cylinder in which drill holes are linearly formed, through-holes which correspond the drill holes, respectively, a flange in which a communication portion for communicating the through-holes with each other is formed, and detachable siphon pipes which are inserted into the drill holes, respectively.

5 Claims, 4 Drawing Sheets

HEAT EXCHANGING MECHANISM FOR A CYLINDER OF AN EXTRUDER

BACKGROUND

1. Technical Field

The present invention relates to a heat exchanging mechanism of a cylinder of a screw type extruder and a heat exchanging method.

2. Description of Related Art

A cylinder of an extruder is cooled or heated by passing a medium through a cooling/heating jacket provided in the cylinder to exchange heat using evaporative latent heat or sensible heat of the medium.

A medium jacket is provided on the outer circumference of a screw receiving hole for receiving a screw in a spiral shape (JP-A-11-198215 and JP-A-5-057768) or is provided in the axial direction of a screw receiving hole as shown in FIGS. 5A to 7B.

FIGS. 5A to 7B are front views and side views of an intermediate cylinder, a vent cylinder and a side feed cylinder of a twin-screw extruder including a conventional heat exchanging mechanism, respectively, each of which A is the front view and B is the side view.

In the intermediate cylinder 110 shown in FIG. 5A, a screw receiving portion 100 having a cross-sectional shape in which two circular arcs communicate with each other and a drill jacket 101 surrounding the screw receiving portion are formed. Tie bar bolt holes 103 are formed in the outside of the drill jacket 101.

The drill jacket 101 is used as a cooling/heating jacket and includes drill holes 106 which are a plurality of through-holes formed in an axial longitudinal direction of the screw receiving portion 100 and have a circumferential shape, a medium flowing port 104 which communicates with the outside of the cylinder, bypasses 105 for communicating the drill holes 106 with one another, and jacket closing plates 107 for forming a medium flow path, that is, the jacket, by closing the both ends of the drill holes 106 and the bypasses 105 in the front and rear surfaces of the intermediate cylinder 110. The jacket closing plates 107 are attached to the both ends of the intermediate cylinder 110 by welding. (see FIGS. 5A and 5B)

A vent hole 121 is formed in a vent cylinder 120 shown in FIGS. 6A and 6B and a side feed hole 131 is formed in a side feed cylinder 130 shown in FIGS. 7A and 7B. Accordingly, in the cylinders 120 and 130, the drill holes 106 are formed in a region in which the vent hole 121 and the side feed hole 131 are not formed.

Next, the flow of the medium in the drill jacket 101 will be described. The medium is fed from one side of the flowing port 104. The fed medium flows into the bypass 105 in the circumferential direction of the screw receiving portion 100 and then flows into the drill hole 106 through one end of the drill hole 106 which communicates with the bypass 105. The medium flowing into the drill hole 106 flows to the other end of the drill hole 106 in the axial direction of the screw receiving portion 100 while the inside of the screw receiving portion 100 is cooled or heated. The medium which reaches the other end of the drill hole 106 flows into an adjacent drill hole 106 through the bypass 105. The medium continuously flows as described above and finally flows out of the intermediate cylinder 110 through the other side of the flowing port 104.

A method of flowing the medium in the drill jacket 101 of the vent cylinder 120 shown in FIGS. 6A, 6B or the side feed cylinder 130 shown in FIGS. 7A, 7B is similar to the above-described method of flowing the medium in the drill jacket 101 of the intermediate cylinder 110.

SUMMARY

However, when the plurality of drill holes 106 which penetrate in the axial direction and the bypasses 105 for communicating the drill holes 106 with one another are formed in the cylinders 110, 120 and 130 and the jacket closing plate 107 is closed to form the drill jacket, the structure thereof is complicated and it takes much time to manufacture or weld the cylinder. In addition, since the structure is complicated, dimensional restriction occurs and thus the size of the cylinder cannot be reduced. As a result, a large heat capacity or a large cooling capacity is required.

Since the intermediate cylinder 110, the vent cylinder 120 and the side feed cylinder 130 are different from one another in the structure, the numbers or the formed positions of the drill holes 106 are different from one another. As a result, heat exchanging efficiency depends on the shape of the cylinder.

Since the drill jacket 101 has a closed structure in the cylinder, it is difficult to clean the jacket when the jacket is clogged.

Accordingly, it is an object of the present invention to provide a heat exchanging mechanism of a screw type extruder which has a simple structure capable of equivalently performing cooling and heating regardless of the structural difference between cylinders and being easily cleaned, and a heat exchanging method.

According to an aspect of the invention, there is provided a heat exchanging mechanism for exchanging heat between a medium and a molten material in a screw receiving portion formed in a cylinder, the heat exchanging mechanism including: the cylinder in which drill holes are linearly formed in a direction crossing the screw receiving portion; a flange which includes through-holes respectively corresponding to the drill holes and a communication portion for communicating the through-holes with each other and is detachably attached to the cylinder such that the through-holes respectively correspond to the drill holes; and detachable siphon pipes which pass through the through-holes of the flange to be inserted into the drill holes, respectively, wherein gaps are formed between the siphon pipes and the through-holes of the flange, respectively, gaps are formed between the outer circumferences of the siphon pipes and the inner circumferences of the drill holes, respectively, and front end spaces are formed between front ends of the siphon pipes and deepest portions of the drill holes, respectively.

According to the above-aspect, since all the flow paths in which the medium flows, such as the drill holes and the communication portion, are linearly formed, inside cleaning is easy. Since the structure of the heat exchanging mechanism is simple, and also is applicable to cylinders having different shapes, such as an intermediate cylinder, a vent cylinder and a side feed cylinder. Accordingly, heat exchanging efficiency does not significantly depend on the shape of the cylinder.

According to another aspect of the invention, vibration preventing bodies which are in contact with the inner circumferences of the drill holes may be provided on the outer circumferences of the siphon pipes, respectively. In this case, the siphon pipes are prevented from being cantilever-supported by bringing the vibration preventing bodies into contact with the inner circumferences of the drill holes. Accordingly, it is possible to prevent the pipes from being fatigue-broken due to repeated vibrations and to prevent the front ends of the pipes from being broken due to collision with the insides of the drill holes.

According to the above-aspects, the flange 30 may be fixed to the cylinder by bolts. In this case, since the attachment and detachment of the flange is easy, the inside cleaning of the communication portion formed in the flange is easy. In addition, since a conventional operation for welding the jacket closing plate is unnecessary, the heat exchanging mechanism is easily provided in the cylinder.

According to another aspect of the present invention, there is provided a method of using the heat exchanging mechanism according to the present invention, including: feeding the medium into the siphon pipe through one end thereof and discharging the medium to the front end space through the other end thereof; flowing the discharged medium from the front end space into the gap; flowing the medium, which passes through the gap, into the communication portion through the gap; flowing the medium, which flows in the communication portion, into the gap through the gap; flowing the medium, which passes through the gap, into the front end space; and flowing the medium, which flows into the front end space, into the siphon pipe through one end thereof and discharging the medium through the other end thereof.

BRIEF DESCRIPTION OF THE DRAWINGS

FIG. 1A is a cross-sectional view taken along line 1A-1A of FIG. 1B and FIG. 1C is a cross sectional view of the siphon pipe taken along line 1C-1C of FIG. 1A.

FIGS. 5A and 5B depict prior art.

FIGS. 6A and 6B depict prior art.

FIGS. 7A and 7B depict prior art.

DESCRIPTION OF EMBODIMENTS

Figure 1B:
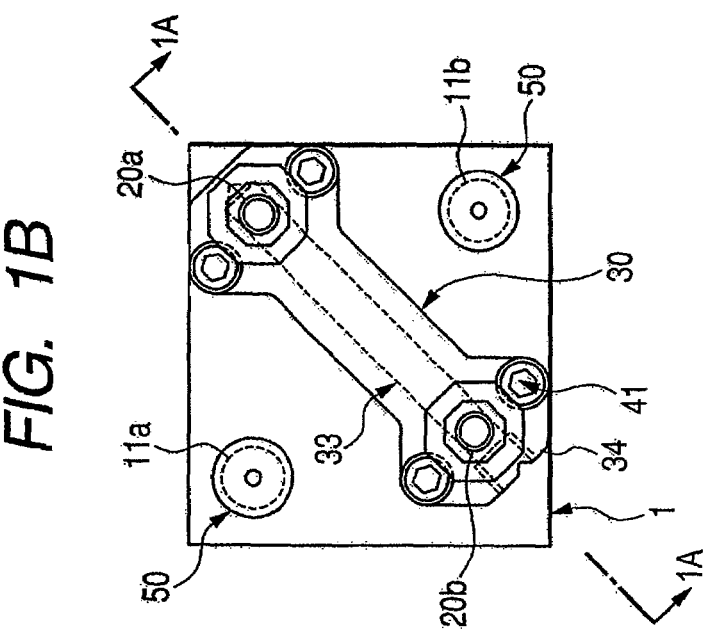
FIGS. 1A and 1B are a cross-sectional view and a side view of an example of a heat exchanging mechanism of the present invention, respectively.
Figure 1A:
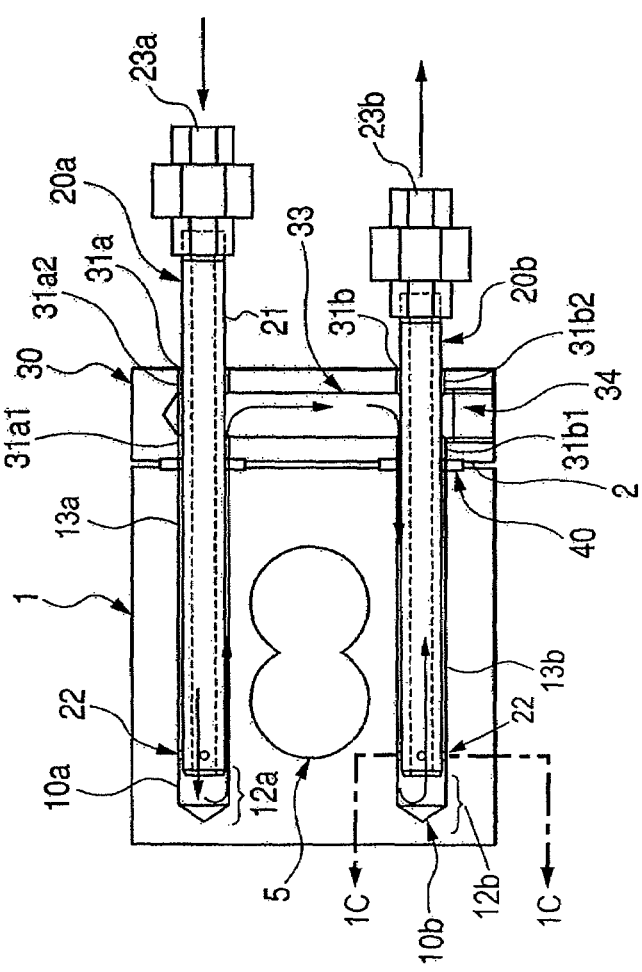

FIGS. 1A and 1B are a cross-sectional view and a side view of a heat exchanging mechanism according to the present embodiment, respectively. FIG. 1A is a cross-sectional view taken along line 1A-1A of FIG. 1B.

The heat exchanging mechanism according to the present embodiment includes a cylinder 1 for kneading molten materials, first and second siphon pipes 20a and 20b for feeding a medium for exchanging heat with the molten materials in the cylinder 1 by transmitting and receiving evaporative latent heat and sensible heat, and a flange 30 for configuring a portion of a flow path of the medium.

The cylinder 1 has a substantially cubic shape and includes a screw receiving portion 5 having a cross-sectional shape in which two circular arcs are communicate with each other. In the cylinder 1, a first drill hole 10a and a heater hole 11a are formed in the upper side of the screw receiving portion 5 and a second drill hole 10b and a heater hole 11b are formed in the lower side of the screw receiving portion 5. The first drill hole 10a and the second drill hole 10b are formed at a diagonal line of the cylinder 1, as shown in FIG. 1B. The first and second drill holes 10a and 10b are formed from a side surface 2 and do not penetrate through the cylinder 1. Since the first and second drill holes 10a and 10b are linearly formed by a drilling operation, the first and second drill holes 10a and 10b can be easily formed. The heater holes 11a and 11b are formed by a drilling operation and may penetrate through the cylinder 1 or may not penetrate through the cylinder 1.

First and second siphon pipes 20a and 20b are detachably inserted into the first and second drill holes 10a and 10b, respectively, and heaters 50 such as sheath heaters are detachably inserted into the heater holes 11a and 11b. When maintenance such inside cleaning of the first and second drill holes 10a and 10b and inside cleaning of the first and second siphon pipes 20a and 20b is performed, the first and second siphon pipes 20a and 20b are pulled out of the first and second drill holes 10a and 10b.

The flange 30 in which through-holes 31a and 32a are formed at the both sides is attached to the side surface 2 of the cylinder 1 with gaskets 40 interposed therebetween. Inserting through-holes into which bolts 41 are inserted are formed in the both sides of the through-holes 31a and 31b and the flange 30 is fixed to the cylinder 1 by the bolts 41 which penetrate through the inserting through-holes. A communication portion 33 for communicating the through-hole 31a and the through-hole 31b with each other is formed in the flange 30. In the flange 30 according to the present embodiment, the communication portion 33 is formed by performing a drill operation from the end of the through-hole 31b. Accordingly, in order to close the opening of the through-hole 31b of the flange 30, a closing plug 34 is inserted into the opening. The closing plug 34 can be detached.

Figure 1C:
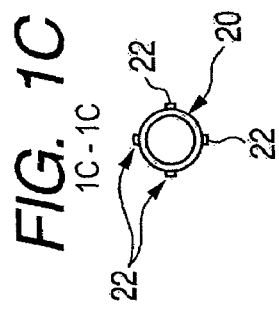
FIG. 1C is a cross-sectional view of the siphon pipe.

As shown in FIG. 1C, the first siphon pipe 20a has an outer diameter smaller than the inner diameter of the first drill hole 10a and the heater hole 1 la and four vibration preventing bodies 22 are provided on the outer circumference of the first siphon pipe 20a at 90 degrees each as a front end. The vibration preventing bodies 22 may be provided by spot welding. Although four vibration preventing bodies are provided in the present embodiment, the number of the vibration preventing bodies is not limited thereto.

The four vibration preventing bodies 22 are in contact with the inner wall surface of the first drill hole 10a in a state where the first siphon pipe 20a is inserted into the first drill hole 10a. The function of the vibration preventing body 22 will be described later. The structure of the second siphon pipe 20b is equal to that of the first siphon pipe 20a.

Next, the flow of the medium in a state where the siphon pipe is attached will be described.

The medium is fed from a medium inlet 23a located on one side of the first siphon pipe 20a. The fed medium passes through the first siphon pipe 20a and discharges into a front end space 12a through the other side thereof. The front end space 12a is formed between the front end of the first siphon pipe 20a and the front end of the hole of the first drill hole 10a and is a deepest portion formed by the drill operation. The flowing direction of the medium is changed to a direction opposite to a feeding direction (U-turn) and the medium passes through a gap 13a formed between the outer circumference of the first siphon pipe 20a and the inner circumference of the first drill hole 10a and flows toward the communication portion 33 of the flange 30. When the medium flows in the gap 13a, the molten materials in the screw receiving portion 5 is cooled or heated through the cylinder 1.

The medium, which flows in the gap 13a toward the flange 30 while exchanging heat, flows into the communication portion 33 of the flange 30. Since the gasket 40 is inserted between the cylinder 1 and the flange 30, the medium is not leaked between the cylinder 1 and the flange 30 when flowing from the cylinder 1 to the flange 30. Gaps 31a1 and 31a2 are formed between the through-hole 31a of the flange 30 and the first siphon pipe 20a. The medium flows into the communication portion 33 through the gap 31a1. The gap 31a2 is sealed (not shown) and thus the medium is not leaked from the gap 31a2.

The medium, which flows into the communication portion 33, passes through the gap 13b formed between the outer circumference of the second siphon pipe 20b and the inner circumference of the second drill hole 10b and flows into the a front end space 12b. Since the gasket 40 is inserted between the flange 30 and the cylinder 1, the medium is not leaked between the cylinder 1 and the flange 30. Gaps 31b1 and 31b2 are also formed between the through-hole 31b of the flange 30 and the second siphon pipe 20b. The medium flows from the communication portion 33 into the gap 13b through the gap 31b1. The gap 31b2 is sealed (not shown) and thus the medium is not leaked from the gap 31b2.

The medium, which flows in the gap 13b while exchanging the heat, flows into the front end space 12b. The front end space 12b is formed between the front end of the second siphon pipe 20b and the front end of the hole of the second drill hole 10b. Since the closing plug 34 is inserted into the second siphon pipe 20b of the communication portion 33, the medium is not leaked from the flange 30 to the outside.

The flowing direction of the medium is changed to the direction opposite to the feeding direction and the medium flows from the opening of the front end of the second siphon pipe 20b into the second siphon pipe 20b. The medium, which flows into the second siphon pipe 20b, is discharged to the outside through a medium outlet 23b.

The cylinder 1 according to the present embodiment may vibrate due to pulsation of the medium when the materials are kneaded by an unillustrated screw in the screw receiving portion 5 or the medium flows in the gaps 13a and 13b. When such vibration is continuously generated, the vibration is delivered to the siphon pipes 20a and 20b and thus the siphon pipes 20a and 20b vibrate in the drill holes 10a and 10b, respectively. When the vibration is repeatedly applied, the siphon pipes 20a and 20b may be fatigue-broken, and, when the vibration is large, the front ends of the siphon pipes 20a and 20b may be bumped against the inner wall surfaces of the drill holes 10a and 10b to be broken, respectively. The vibration preventing bodies 22 press the front ends of the first and second siphon pipes 20a and 20b against the first and second drill holes 10a and 10b. That is, the vibration preventing bodies 22 prevent the front ends of the siphon pipes from vibrating such that the siphon pipes 20a and 20b are cantilever-supported to prevent fatigue breaking or collision of the front ends of the pipes described above.

Next, FIGS. 2A to 4B are front views and side views of an intermediate cylinder, a vent cylinder and a side feed cylinder according to the present embodiment, respectively, each of which A is the front view and B is the side view.

Figure 2A:
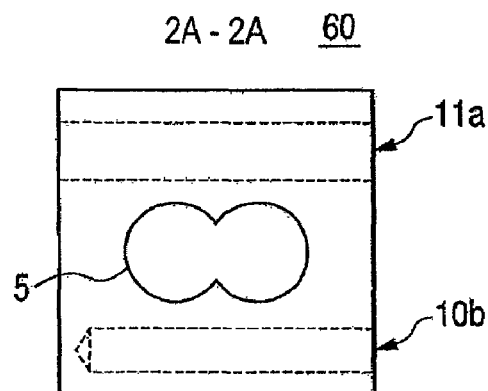
FIGS. 2A and 2B are a front view and a side view of an intermediate cylinder of a small-sized extruder using the heat exchanging mechanism according to the present invention, respectively. The front view of FIG. 2A is taken along line 2A-2A of FIG. 2B.
Figure 2B:
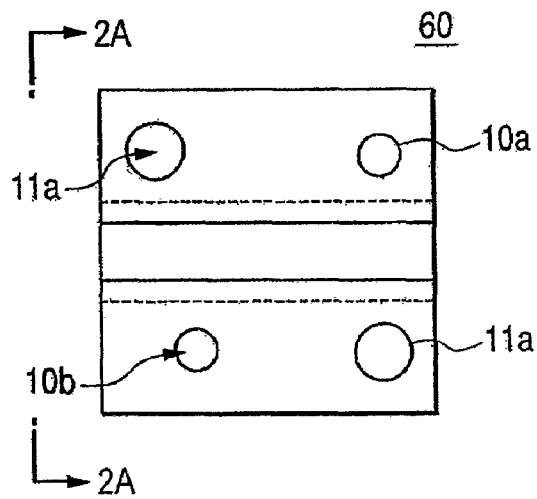
Figure 3A:
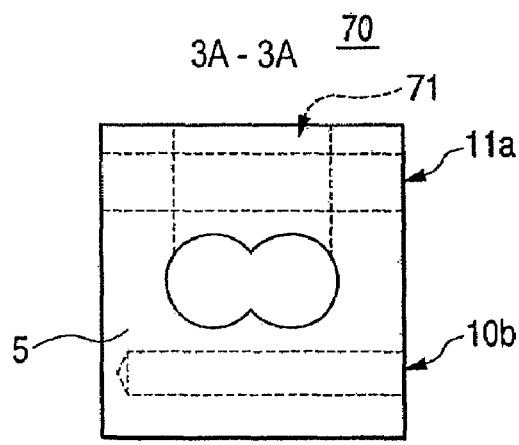
FIGS. 3A and 3B are a front view and a side view of a vent cylinder of a small-sized extruder using the heat exchanging mechanism according to the present invention, respectively. The front view of FIG. 3A is taken along line 3A-3A of FIG. 3B.
Figure 3B:
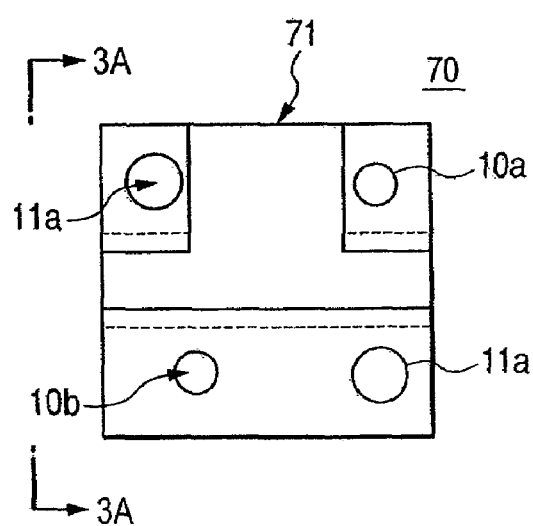
Figure 4A:
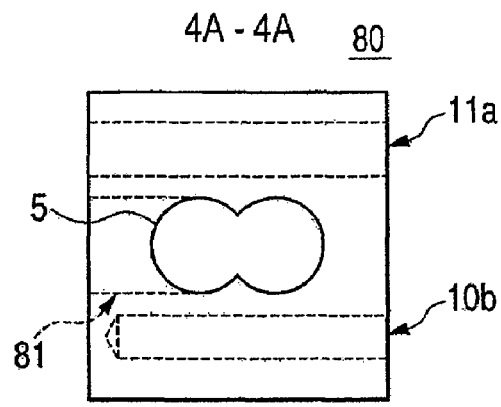
FIGS. 4A and 4B are a front view and a side view of a side feed cylinder of a small-sized extruder using the heat exchanging mechanism according to the present invention, respectively. The front view of FIG. 4A is taken along line 4A-4A of FIG. 4B.
Figure 4B:
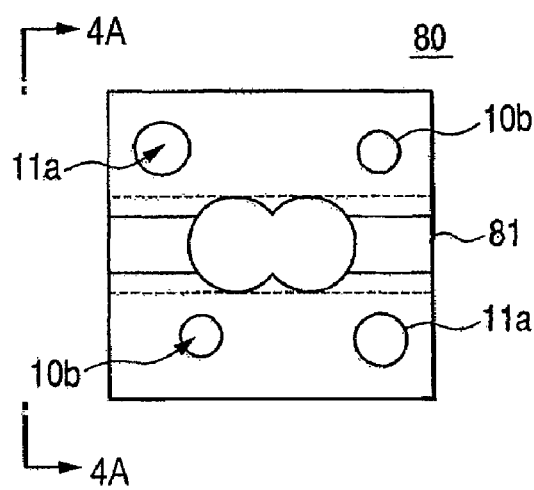
Figure 5A:
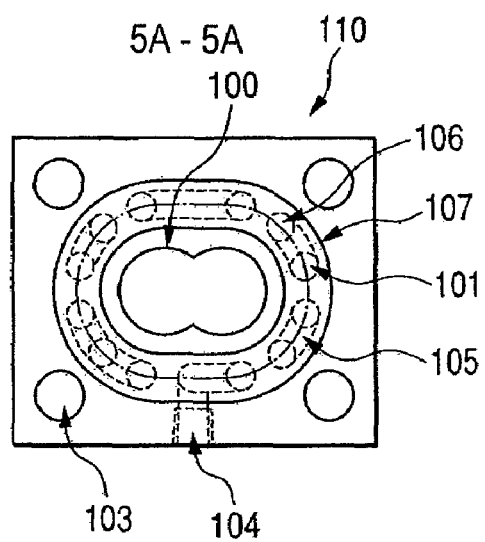
FIGS. 5A and 5B are a front view and a side view of an example of an intermediate cylinder of a small-sized extruder using a conventional heat exchanging mechanism, respectively. The front view of FIG. 5A is taken along line 5A-5A of FIG. 5B.
Figure 5B:
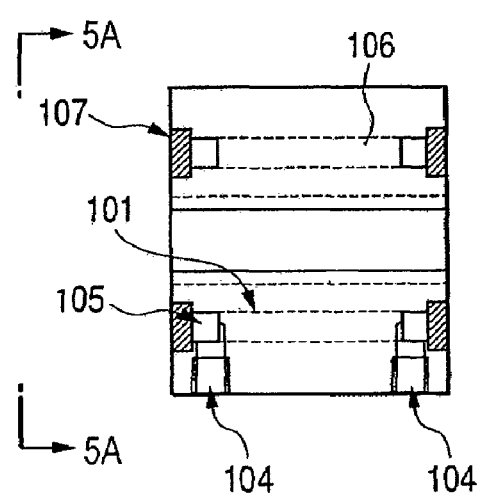
Figure 6A:
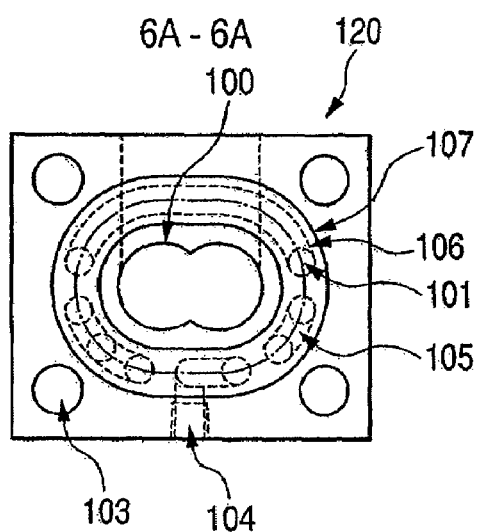
FIGS. 6A and 6B are a front view and a side view of an example of a vent cylinder of a small-sized extruder using the conventional heat exchanging mechanism, respectively. The front view of FIG. 6A is taken along line 6A-6A of FIG. 6B.
Figure 6B:
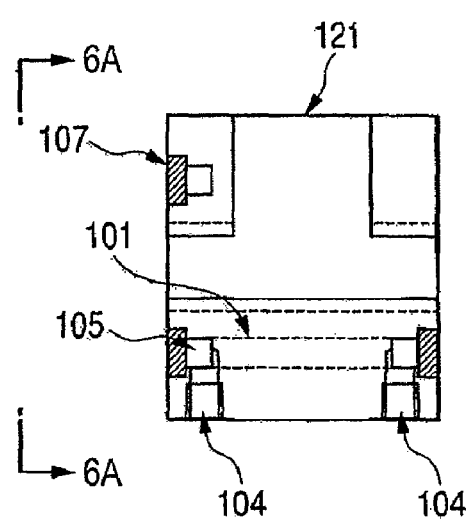
Figure 7A:
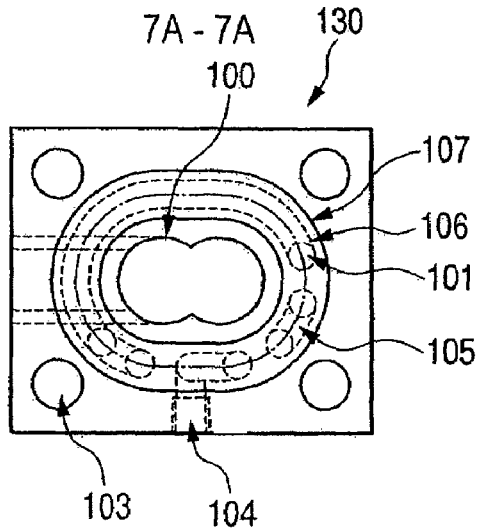
FIGS. 7A and 7B are a front view and a side view of an example of side feed cylinder of a small-sized extruder using the conventional heat exchanging mechanism, respectively. The front view of FIG. 7A is taken along line 7A-7A of FIG. 7B.
Figure 7B:
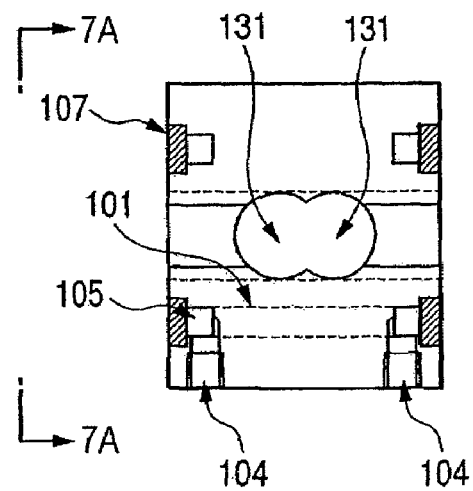

The intermediate cylinder 60 shown in FIGS. 2A, 2B has the same structure as that of the cylinder 1 shown in FIGS. 1A, 1B. In the intermediate cylinder 60, a screw receiving portion 5 is formed in a substantially central portion, first and second drill holes 10a and 10b are formed at a diagonal line, and two heater holes 11a are formed. In the vent cylinder 70 shown in FIGS. 3A, 3B, a vent hole 71 is formed, in addition to the above-described configuration. In the side feed cylinder 80 shown in FIGS. 4A, 4B, a side feed hole 81 is formed.

As described above, the cylinder 1 can be cooled and heated by the simple structure according to the present embodiment. That is, in the heat exchanging mechanism according to the present embodiment, the medium flow path for exchanging heat with the molten materials in the screw receiving portion 5 is configured by the cylinder 1 in which the first and second drill holes 10a and 10b are formed and do not penetrate, the flange 30 fixed to the cylinder 1 by the bolts 41 so as to communicate the first and second drill holes 10a and 10b with each other and the first and second siphon pipes 20a and 20b which are inserted into the first and second drill holes 10a and 10b, respectively.

Since the linear flow path is formed by the first and second drill holes 10a and 10b and the first and second siphon pipes 20a and 20b in the heat exchanging mechanism according to the present embodiment, the cylinder can be easily manufactured.

In the conventional cylinder, the jacket closing plate was attached by welding so as to configure the medium flow path. In contrast, the heat exchanging mechanism according to the present embodiment employs a configuration in which the cylinder 1 is fixed at the flange 30 by the bolts 41. Accordingly, since the welding is unnecessary when the heat exchanging mechanism according to the present embodiment is manufactured, the manufacture thereof is easy and thus the cost can be reduced. By such a simple structure, the device can be easily miniaturized.

The cleaning of the heat exchanging mechanism according to the present embodiment is performed by extracting the siphon pipes from the drill holes and cleaning the insides of the drill holes. Only the outer circumferences and the inner circumferences of the extracted siphon pipes may be cleaned. Since the drill holes and the pipes have the linear shape, the cleaning is very easy.

In the conventional cylinder, the jacket closing plate was attached by welding so as to configure the medium flow path. In contrast, the heat exchanging mechanism according to the present embodiment employs a configuration in which the cylinder 1 is fixed at the flange 30 by the bolts 41. The communication portion 33 formed in the flange 30 is linearly formed by the drill operation and configures a portion of the closed flow path by inserting the detachable closing plug 34. Accordingly, the inside cleaning of the communication portion 33 can be easily performed by detaching the closing plug 34. Since the flange 30 can be detached from the cylinder 1, workability is good.

In the above description, since all the drill holes formed in the cylinder and the communication portion 33 formed in the flange are formed by the drill operation, the holes have the linear shapes and the present invention is not limited thereto. If the maintenance, such as the inside cleaning of the holes, which is the object of the present invention, is easy, the holes may be slightly bent in the longitudinal direction. Since the holes are formed by the drill operation, the cross section thereof has a circular shape. However, the cross section may have a shape other than the circular shape by using the other known manufacturing method.

According to the above-embodiments, since all flow paths in which a medium flows are linearly formed, inside cleaning is easy. Since the heat exchanging mechanism of the present invention has a simple structure, cost can be reduced and heat exchanging efficiency hardly depends on the shape of the cylinder.

What is claimed is:

1. A heat exchanging mechanism for exchanging heat between a medium and a molten material included in a screw receiving portion of a cylinder, the cylinder having drill holes that are linearly formed in a direction crossing the screw receiving portion;
   a flange having through-holes respectively corresponding to the drill holes and a communication portion for communicating the through-holes with each other, the flange being detachably attached to the cylinder such that the through-holes respectively correspond to the drill holes; and
   detachable siphon pipes that pass through the through-holes of the flange to be inserted into the drill holes, respectively, wherein first gaps are formed between the siphon pipes and the through-holes of the flange, respectively,
   wherein second gaps are formed between outer circumferences of the siphon pipes and inner circumferences of the drill holes, respectively, and
   wherein front end spaces are formed between front ends of the siphon pipes and deepest portions of the drill holes, respectively.

2. The heat exchanging tool according to claim 1, wherein vibration preventing bodies that are in contact with the inner circumferences of the drill holes are provided on the outer circumferences of the siphon pipes, respectively.

3. The heat exchanging tool according to claim 2, wherein the flange is fixed to the cylinder by a bolt.

4. The heat exchanging tool according to claim 1, wherein the flange is fixed to the cylinder by a bolt.

5. A heat exchanging method according to claim 1, comprising;
   feeding the medium into the siphon pipe through one end thereof and discharging the medium to one of the front end space through the other end thereof;
   flowing the discharged medium from one of the front end space into one of the second gap;
   flowing the medium, which passes through one of the second gap, into the communication portion through one of the first gap;
   flowing the medium, which flows in the communication portion, into the other of the second gap through the other of the first gap;
   flowing the medium, which passes through the other of the second gap, into the other of the front end space; and
   flowing the medium, which flows into the other of the front end space, into the siphon pipe through one end thereof and discharging the medium through the other end thereof.

* * * * *